2,993,775
Patented July 25, 1961

1

2,993,775
METHOD OF CONTROLLING VEGETATION
Joseph W. Baker, Nitro, W. Va., assignor to Monsanto Chemical Company, St. Louis, Mo., a corporation of Delaware
No Drawing. Filed Oct. 8, 1956, Ser. No. 614,364
10 Claims.  (Cl. 71—2.7)

This invention relates to methods of destroying or controlling vegetation and to herbicidal compositions. More particularly, it relates to destroying or controlling vegetation by applying thereto an ester of a phosphoroamidic acid.

The esters of phosphoroamidic acid are especially effective contact killers although many of them also exert pre-emergence activity. Accordingly, by applying the toxicant to the plant is meant any means whereby the toxicant is brought into contact with living plants which latter include germinating seedlings, as for example by application to the ground before the plants emerge, but preferably by direct application to the foliage. The phosphoroamidates are effective against both grasses and broadleaved plants.

Phytotoxicity has been observed with neutral esters of phosphoroamidic acids. The herbicides are characterized by the presence of at least one amido group and an organic ester forming group in place of the hydrogen of the phosphoroamidic acid. Outstanding are esters of phosphorodiamidic acids and of these tetra substituted amides in which the substituents are open chain radicals are preferred to compounds containing hydrogen on the nitrogen and to compounds in which the nitrogen is part of a ring system. Preferably all the substituents including the ester substituents at well as those on the nitrogen are open chain radicals. Corresponding esters of phosphoroamidothionic acids have been studied but are much less effective.

The new toxicants may be applied conveniently in the form of a spray containing the active ingredient in a concentration within the range of 0.1% to 10% by weight. Thorough coverage of the foliage is desirable. For pre-emergence application amounts within the range of 10 to 60 pounds per acre are recommended. Weeds from the following plant families are controlled to varying degrees: Leguminosae, Cucurbitaceae, Graminea, Chenopodiaceae, Amaranthaceae, Convolvulaceae and Polygonaceae.

Most of the phosphoroamidates are insoluble in water but they are soluble in common organic solvents. They may be dispersed directly in water or dissolved first in an organic solvent and then dispersed. As dispersing and wetting agents there may be employed soft or hard sodium potassium soaps, alkylated aromatic sodium sulfonates such as sodium dodecyl benzene sulfonate, or an amine salt of dodecyl benzene sulfonic acid, alkali metal salts of sulfated fatty alcohols, ethylene oxide condensation products of alkyl phenols or tall oil and other dispersing and wetting agents. The herbicides may be formulated and applied as dry compositions by mixing the toxicant with a finely divided solid carrier, as for example talc, clay, pyrophyllite, silica and fuller's earth. Alternatively, the dry, solid, free-flowing mixture of the phosphoroamidate and solid carrier may be dispersed in water and applied as a spray.

2

As typical examples of the new herbicides there may be mentioned propyl tetramethylphosphorodiamidate, butyl tetramethylphosphorodiamidate, amyl tetramethylphosphorodiamidate, hexyl tetramethylphosphorodiamidate, heptyl tetramethylphosphorodiamidate, octyl tetramethylphosphorodiamidate, 2-ethylhexyl tetramethylphosphorodiamidate, nonyl tetramethylphosphorodiamidate, decyl tetramethylphosphorodiamidate, undecyl tetramethylphosphorodiamidate, dodecyl tetramethylphosphorodiamidate, propyl tetraethylphosphorodiamidate, butyl tetraethylphosphorodiamidate, amyl tetraethylphosphorodiamidate, hexyl tetraethylphosphorodiamidate, heptyl tetraethylphosphorodiamidate, octyl tetraethylphosphorodiamidate, nonyl tetraethylphosphorodiamidate, decyl tetraethylphosphorodiamidate, undecyl tetraethylphosphorodiamidate, dodecyl tetraethylphosphorodiamidate, ethoxyethyl tetraethylphosphorodiamidate, 2-chloroallyl tetraethylphosphorodiamidate, 3-chloroallyl tetraethylphosphorodiamidate, 2-bromoallyl tetraethylphosphorodiamidate, 2,3-dichloroallyl tetraethylphosphorodiamidate, 3,3-dichloroallyl tetraethylphosphorodiamidate, 2-fluoro-3-chloroallyl tetraethylphosphorodiamidate, methyl tetrapropylphosphorodiamidate, propyl tetrapropylphosphorodiamidate, butyl tetrapropylphosphorodiamidate, amyl tetrapropylphosphorodiamidate, hexyl tetrapropylphosporodiamidate, 2-ethylhexyl tetrapropylphosphorodiamidate, octyl tetrapropylphosphorodiamidate, nonyl tetrapropylphosphorodiamidate, decyl tetrapropylphosphorodiamidate, undecyl tetrapropylphosphorodiamidate, dodecyl tetrapropylphosphorodiamidate, 2-chloroallyl tetrapropylphosphorodiamidate 2,3-dichloroallyl tetrapropylphosphorodiamidate, 2-fluoro-3-chloroallyl tetrapropylphosphorodiamidate, 2-bromallyl tetrapropylphosphorodiamidate, methyl tetraallylphosphorodiamidate, ethyl tetraallylphosphorodiamidate, propyl tetraallylphosphorodiamidate, allyl tetraallylphosphorodiamidate, butyl tetraallylphosphorodiamidate, amyl tetraallylphosphorodiamidate, hexyl tetraallylphosphorodiamidate, heptyl tetraallylphosphorodiamidate, octyl tetraallylphosphorodiamidate, methyl tetrabutylphosphorodiamidate, ethyl tetrabutylphosphorodiamidate, propyl tetrabutylphosphorodiamidate, allyl tetrabutylphosphorodiamidate and butyl tetrabutylphosphorodiamidate.

The tables below illustrate characteristic herbicidal activity of typical phosphoroamidates. The ester was emulsified in water and the emulsion applied as a spray. In the foliage tests the spray containing the concentration of the active ingredient shown in the table was applied to the foliage of grass and foliage of bean plants and finally to the foliage of a mixture of broadleaved plants and the effect recorded. In the pre-emergence tests the spray was applied to the ground of seeded plots before the grass or other plants emerged. For convenience in recording the phytotoxicity the following rating key for phytotoxicity was used:

|  | Contact | Pre-Emergence |
|---|---|---|
| No Phytotoxicity | 0 | 0 |
| Slight Phytotoxicity | 1 | 1 |
| Moderate Phytotoxicity | 2 | 2 |
| Severe Phytotoxicity | 3 | 3 |
| Dead | 4 | |
| Defoliation | B | |

TABLE I

Contact

| Active Ingredient | Conc., Percent | Phytotoxicity Rating | | |
|---|---|---|---|---|
| | | Grass | Bean | Broad-leaf |
| 1. Ethyl tetraethylphosphorodiamidate. | 0.5 | 1+ | 3 | 3+ |
| 2. Ethyl tetrapropylphosphorodiamidate. | 0.5 | 4 | 4 | 4 |
| | 0.2 | 3+ | 4B | 4 |
| 3. Ethyl tetraallylphosphorodiamidate. | 0.5 | 4 | 4 | 4 |
| | 0.2 | 3 | 3B | 3+ |
| 4. Ethyl tetrabutylphosphorodiamidate. | 0.5 | 4 | 4 | 4 |
| | 0.2 | 4 | 4B | 4 |
| 5. Butyl tetramethylphosphorodiamidate. | 0.5 | 0 | 2 | 2+ |
| 6. Butyl tetrapropylphosphorodiamidate. | 0.5 | 4 | 4 | 4 |
| | 0.2 | 3+ | 3+B | 4 |
| 7. 2-Ethylhexyl tetramethylphosphorodiamidate. | 0.5 | 4 | | 4 |
| 8. 2-Cyanoethyl tetramethylphosphorodiamidate. | 1.0 | 1 | 2B | 3 |
| 9. Benzyl tetramethylphosphorodiamidate. | 0.5 | 1+ | 2+ | 2+ |
| 10. p-Nitrophenyl tetramethylphosphorodiamidate. | 1.0 | 1 | 4B | 3+ |
| | 0.3 | 1 | 3B | 2 |

The plants employed in the pre-emergence tests are designated by letter in Table II. The plants corresponding to the letters are as follows:

A. Wild oat
B. Brome grass
C. Rye grass (domestic)
D. Buckwheat
E. Mustard (radish)
F. Red clover
G. Beet-sugar
H. Cotton
J. Cucumber
K. Corn
L. Foxtail

TABLE II

Pre-emergence

| Compound No. | Lbs./Acre | Phytotoxicity Rating | | | | | | | | | |
|---|---|---|---|---|---|---|---|---|---|---|---|
| | | A | B | C | D | E | F | G | H | J | K | L |
| 1 | 25 | 2 | 1 | 0 | 0 | 2 | 3 | 1 | 2 | 1 | 0 | --- |
| 2 | 25 | 1 | 3 | 3 | 1 | 3 | 3 | 3 | 0 | 2 | 0 | 3 |
| 3 | 25 | 1 | 3 | 3 | 2 | 3 | 3 | 3 | 1 | 2 | 0 | 3 |
| 4 | 25 | 2 | 3 | 3 | 0 | 3 | 3 | 3 | 3 | 0 | 0 | 3 |
| 4 | 10 | 0 | 2 | 3 | 0 | 0 | 3 | 3 | 0 | 0 | 0 | 3 |
| 6 | 25 | 1 | 3 | 3 | 2 | 3 | 3 | 3 | 0 | 0 | 0 | 3 |
| 6 | 10 | 0 | 1 | 3 | 1 | 3 | 3 | 3 | 0 | 0 | 0 | 3 |

Many of the phosphoroamidates disclosed herein are new compounds. Others are well known and in general all of them can be prepared by methods the same as or analogous to those heretofore described. Ethyl tetramethylphosphorodiamidate may be prepared by the method of David and Kilby, Nature, vol. 164, pages 522–3 (1949). This synthesis, involving condensation of tetramethylphosphorodiamidic chloride and sodium ethylate, is applicable to the synthesis of other esters by substituting other sodium alcoholates and to condensation of other phosphoroamidic chlorides. In some cases it is more satisfactory to condense a phosphorodichloridate with an amine. Typical methods by which the new toxicants may be prepared are described in detail below:

EXAMPLE I

Into a suitable reaction vessel 49 parts by weight (0.3 mole) of ethyl phosphorodichloridate were dissolved in 243 parts of n-heptane and the solution cooled to 20° C. Then, 175 parts by weight (1.8 moles) of diallylamine were added over a period of 40 minutes with external cooling to maintain the temperature at 25–50° C. The mixture was then heated at 50–55° C. for 30 minutes, thereupon the temperature was increased to the refluxing point and held thereat for 6 hours. The mass was then allowed to cool to room temperature and the by-product salt separated by filtration. The filter cake was washed with n-heptane and the combined filtrates stripped of solvent. More particularly, the mass was heated up to a pot temperature of 110° C./30 mm. to remove the n-heptane. The residue was filtered through clay and the filtrate fractionated. The ethyl tetraallylphosphorodiamidate thus obtained distilled at 121–125° C./1.5 mm. pressure at a pot temperature of 144° C. Analysis gave 11.1% phosphorus and 10.0% nitrogen as compared to values of 10.9% phosphorus and 9.8% nitrogen calculated for $C_{14}H_{25}N_2O_2P$.

EXAMPLE II

Replacing diallylamine in the above example with an equimolar proportion of dibutylamine, the ethyl tetrabutylphosphorodiamidate so obtained distilled at 140–155° C./2 mm. pressure at a pot temperature of 182–220° C. Analysis gave 9.6% phosphorus and 8.1% nitrogen as compared to values of 8.9% phosphorus and 8.0% nitrogen calculated for $C_{18}N_{41}N_2O_2P$.

EXAMPLE III

Butyl tetrapropylphosphorodiamidate was prepared as in Example 1 except that the butyl phosphorodichloridate was added to the dipropylamine in the reaction vessel. The product distilled at 138–150° C./2 mm. Analysis gave 9.8% phosphorus and 8.9% nitrogen as compared to values of 10.3% phosphorus and 9.3% nitrogen calculated for $C_{16}H_{37}N_2O_2P$.

EXAMPLE IV

A solution of sodium p-nitrophenate in toluene was prepared by adding 113.6 parts by weight (0.333 mole) of sodium ethylate (19.97% solution) to 46.4 parts by weight (0.333 mole) of p-nitrophenol in 584.5 parts by weight of toluene. The by-product ethyl alcohol was removed through a Dean-Stark trap by distillation. The solution was cooled to 40° C. and 56.9 parts by weight (0.333 mole) of tetramethyl phosphorodiamidic chloride and 0.733 parts by weight of triethylamine added. The mixture was then heated slowly to 85° C. and heated at this temperature for 2 hours. Thereupon, 4 parts by weight of sodium p-nitrophenate was added and heating continued for an additional hour. The by-product salt was removed by filtration and the filtrate extracted twice with 125 ml. portions of 10% sodium carbonate and once with 125 ml. of water. The aqueous solution was extracted with two 75 ml. portions of chloroform and the chloroform extract washed with water. The combined extracts were stripped of solvents by heating to a pot temperature of 110° C./10 mm. and the desired p-nitrophenyl tetramethylphosphorodiamidate obtained as the residue in 91.8% yield. The product was filtered through a thin layer of Attapulgus clay and the dark brown liquid analyzed 12.2% phosphorus and 13.7% nitrogen as compared to 11.3% phosphorus and 15.4% nitrogen calculated for $C_{10}H_{14}N_3O_4P$.

EXAMPLE V

Into a flask fitted with a Dean-Stark trap was charged 13.0 parts by weight (0.1 mole) of 2-ethyl hexanol, 31.5 parts by weight (0.1 mole) of a 21.6% solution of sodium ethylate and 104 parts by weight of toluene. The mixture was stirred with heating until the vapor temperature reached 110° C. and all ethyl alcohol removed. Upon cooling 28.2 parts by weight (0.1 mole) of tetrapropyl phosphorodiamidic chloride was added and the temperature slowly raised to 90° C. and held there for 4 hours. After cooling, the mixture was filtered and the filtrate washed with a saturated salt solution. The organic layer was stripped to a pot temperature of 110° C./20 mm. to give 2-ethylhexyl tetrapropylphosphorodiamidate analyzing 8.15% phosphorus and 7.57% nitrogen as compared to 8.25% phosphorus and 7.45% nitrogen calculated for $C_{20}H_{35}N_2O_2P$.

The herbicidal effectiveness of the preferred compounds persists for long periods of time and permits use as soil sterilants. Soil containing a variety of grass and broadleaf seeds to which ethyl tetrabutylphosphorodiamidate had been applied at the rate of 20 and 40 pounds per acre was essentially free from plant growth after three months during which period 24 inches of rain fell. Thus, the phosphoroamidates comprise soil sterilants as well as herbicides and defoliants.

It is intended to cover all changes and modifications of the examples of the invention herein chosen for purposes of disclosure which do not constitute departures from the spirit and scope of the invention.

What is claimed is:

1. A method of destroying vegetation which comprises contacting the plant with a phytotoxic amount of a phytotoxic ester of phosphorodiamidic acid characterized by the structure

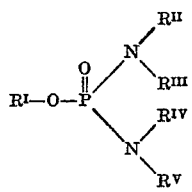

where $R^I$ is selected from the group consisting of alkyl radicals containing one to twelve carbon atoms inclusive, cyanoethyl, ethoxyethyl, benzyl and nitrophenyl and $R^{II}$, $R^{III}$, $R^{IV}$ and $R^V$ are selected from the group consisting of lower alkly and allyl radicals with the proviso that when $R^I$ is methyl each of $R^{II}$, $R^{III}$, $R^{IV}$ and $R^V$ contain at least three carbon atoms.

2. A method of destroying vegetation which comprises contacting the plant with a phytotoxic amount of an alkyl ester in which said said alkyl group contains one to twelve carbon atoms inclusive, of N-tetra allyl phosphorodiamidic acid.

3. A method of destroying vegetation which comprises applying to the foliage thereof a phythotoxic concentration of an alkyl ester in which said alkyl group contains two to twelve carbon atoms inclusive, of a tetra lower alkyl phosphorodiamidic acid.

4. A method of destroying vegetation which comprises applying to the foliage thereof a phytotoxic concentration of a higher alkyl ester in which said alkyl group contains not more than twelve carbon atoms, of a tetra lower alkyl phosphorodiamidic acid.

5. A method of destroying vegetation which comprises applying to the foliage thereof a phytotoxic concentration of a higher alkly ester in which said alkly group contains not more than twelve carbon atoms, of tetramethylphosphorodiamidic acid.

6. A method of destroying vegetation which comprises applying to the foliage thereof a phytotoxic concentration of ethyl tetrapropylphosphorodiamidate.

7. A method of destroying vegetation which comprises applying to the foliage thereof a phytotoxic concentration of ethyl tetraallylphosphorodiamidate.

8. A method of destroying vegetation which comprises applying to the foliage thereof a phytotoxic concentration of ethyl tetrabutylphosphorodiamidate.

9. A method of destroying vegetation which comprises applying to the foliage thereof a phytotoxic concentration of butyl tetrapropylphosphorodiamidate.

10. A method of destroying vegetation which comprises applying to the foliage thereof a phytotoxic concentration of 2-ethylhexyl tetramethylphosphorodiamidate.

References Cited in the file of this patent

UNITED STATES PATENTS

| | | |
|---|---|---|
| 2,151,380 | Flint et al. | Mar. 21, 1939 |
| 2,160,842 | Dreyfus | June 6, 1939 |
| 2,172,241 | Dickery et al. | Sept. 5, 1939 |
| 2,502,966 | Kosolapoff | Apr. 4, 1950 |
| 2,587,549 | Trementazzi | Feb. 26, 1952 |
| 2,623,611 | Levine et al. | Dec. 30, 1952 |
| 2,714,064 | Morris et al. | July 26, 1955 |
| 2,765,252 | Pianka | Oct. 2, 1956 |
| 2,814,636 | Stahmann et al. | Nov. 26, 1957 |
| 2,848,492 | Saul et al. | Aug. 19, 1958 |

FOREIGN PATENTS

| | | |
|---|---|---|
| 605,268 | Great Britain | July 20, 1948 |
| 691,358 | Great Britain | May 13, 1953 |

OTHER REFERENCES

Ramaswami et al.: "Chemical Abstracts," vol. 46, col. 10244(e), 1952.

Capazzi: "Chemical Abstracts," vol. 48, col. 2307(f), 1954, and corresponding Subject Index, page 1427.